US012306838B2

(12) United States Patent
Mayavannan

(10) Patent No.: US 12,306,838 B2
(45) Date of Patent: May 20, 2025

(54) SYSTEM AND METHOD FOR AUTOMATING CLOUD FINANCIAL OPERATIONS MANAGEMENT OPTIMIZATIONS

(71) Applicant: JPMorgan Chase Bank, N.A., New York, NY (US)

(72) Inventor: Neelamuhilvannan Mayavannan, Livingston (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/386,193

(22) Filed: Nov. 1, 2023

(65) Prior Publication Data
US 2025/0139101 A1 May 1, 2025

(51) Int. Cl.
*G06F 16/00* (2019.01)
*G06F 16/23* (2019.01)
*G06F 16/2455* (2019.01)

(52) U.S. Cl.
CPC .... *G06F 16/24564* (2019.01); *G06F 16/2358* (2019.01)

(58) Field of Classification Search
CPC .............. G06F 3/061; G06F 16/2255; G06F 16/24534; G06F 18/213; G06F 3/06; G06F 3/0629; G06F 3/0647; G06F 11/2071; G06F 11/2092; G06F 11/3034; G06F 11/3409; G06F 21/10; G06F 21/64; G06F 3/064; G06F 3/065; G06F 3/067; G06F 8/36; G06F 9/545; G06F 11/3447; G06F 11/3428;
(Continued)

(56) References Cited

U.S. PATENT DOCUMENTS

| 2019/0121889 A1* | 4/2019 | Gold | G06T 1/20 |
| 2022/0052910 A1* | 2/2022 | Neelakantam | G06F 3/061 |
| 2023/0395253 A1* | 12/2023 | Long | G16H 40/67 |

OTHER PUBLICATIONS

How Artificial Intelligence Is Reshaping Banking , Feb. 23, 2024; McKinsey's 2023 banking report; Google search.*
(Continued)

*Primary Examiner* — Shyue Jiunn Hwa
(74) *Attorney, Agent, or Firm* — GREENBLUM & BERNSTEIN, P.L.C.

(57) ABSTRACT

Various methods and processes, apparatuses/systems, and media for automating cloud financial operations management optimizations are disclosed. A processor implements a cloud financial operations management module (CFOMM) and establishes a communication link among the CFOMM, a plurality of infrastructure observability systems, and a plurality of Infrastructure as a Code (Iaac) systems of record (SOR) via a communication interface. The processors triggers the CFOMM through events from the infrastructure observability systems on cloud financial operations management based metrics and alerts data identifying environments to be corrected associated with a cloud; identifies IaaC code's originating code repository and related materials through corresponding SOR; implements an AI LLM to automatically generate new code specific to the environments to be corrected based on predefined rules received from a rule database and the code received from the originating code repository; and automatically corrects the environments associated with the cloud by implementing the new code.

18 Claims, 8 Drawing Sheets

(58) Field of Classification Search
CPC .. G06F 16/245; G06F 16/248; G06F 16/9024; G06F 21/1014; G06F 21/107; G06F 40/30; G06F 40/35; G06N 20/00; G06N 3/08; G06Q 10/00; G06Q 20/00; G06Q 40/00; G06Q 2220/00; G06Q 10/10; G06Q 10/0631; G06Q 10/103; G06Q 20/40; G06Q 30/08; G06Q 40/04; H03M 1/00; H03M 3/00; H03M 5/00
See application file for complete search history.

(56) References Cited

OTHER PUBLICATIONS

How Artificial Intelligence Is Reshaping Banking , Feb. 23, 2024; McKinsey's 2023 banking report: IEEE -Google search.*

* cited by examiner

SYSTEM AND METHOD FOR AUTOMATING CLOUD FINANCIAL OPERATIONS MANAGEMENT OPTIMIZATIONS

TECHNICAL FIELD

This disclosure generally relates to data processing and cloud computing, and, more particularly, to methods and apparatuses for implementing a platform, language, cloud, and database agnostic cloud financial operations management module configured to automate cloud financial operations management through Generative Artificial Intelligence (AI) for cloud infrastructure environments described as code.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence tools. For instance, software has been directed to performance analysis, report generation, project tracking, and competitive analysis, to name but a few. In general, large enterprises, corporations, agencies, institutions, and other organizations are facing a continuing problem of automating the implementation of identified cloud financial operations management due to drift issues.

For example, automating the implementation of identified cloud financial operations management related optimizations across multiple cloud providers based on defined rule sets in environments primarily controlled and deployed through infrastructure configuration as code (e.g., Terraform, CloudFormation, etc.,) without going through the Infrastructure-as-a-Code (IaaC) process may cause drift and may cause inconsistencies in the environment, with risk of changes being overwritten. IaaC is an Information Technology (IT) infrastructure management process that applies best practices from DevOps software development to the management of cloud infrastructure resources. DevOps is the combination of cultural philosophies, practices, and tools that increases an organization's ability to deliver applications and services at high velocity: evolving and improving products at a faster pace than organizations using traditional software development and infrastructure management processes.

But this conventional process may prove to be extremely time consuming for development teams to translate the cloud financial operations management related optimizations into code and deploy. Moreover, this conventional process may involve multiple manual steps thereby subjecting it to errors.

Thus, there is a need for an advanced method and tools that can address these conventional shortcomings corresponding to automating cloud financial operations management.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic cloud financial operations management module configured to automate cloud financial operations management through Generative AI for cloud infrastructure environments described as code, but the disclosure is not limited thereto.

For example, the present disclosure, through one or more of its various aspects, embodiments, and/or specific features or sub-components, also provides, among other features, various systems, servers, devices, methods, media, programs, and platforms for implementing a platform, language, cloud, and database agnostic cloud financial operations management module configured to dynamically and automatically fix environments fully controlled by code in response to cloud financial operations management related alerts; perform these processes across multiple clouds as it leverages the power of the Generative AI Large Language Models (LLMs) to write the code specific to these clouds; reduce the time and effort for the developers to fix the cloud financial operations management related alerts/alarms; define custom rules thereby fine tuning of the LLMs used for this purpose to have accurate code generation, etc., but the disclosure is not limited thereto.

According to exemplary embodiments, a method for automating cloud financial operations management optimizations by utilizing one or more processors along with allocated memory is disclosed. The method may include: implementing a cloud financial operations management module; establishing a communication link among the cloud financial operations management module, a plurality of infrastructure observability systems, and a plurality of IaaC systems of record via a communication interface; triggering the cloud financial operations management module through events from the infrastructure observability systems on cloud financial operations management based metrics and alerts data identifying environments to be corrected associated with a cloud; identifying, in response to triggering, IaaC code's originating code repository and related materials through corresponding systems of record; implementing an AI LLM to automatically generate new code specific to the environments to be corrected associated with the cloud based on predefined rules received from a rule database and code received from the originating code repository; and automatically correcting the environments associated with the cloud by implementing the new code.

According to exemplary embodiments, in implementing the AI LLM, the method may further include: implementing a Generative AI LLM by the cloud financial operations management module to write corresponding new code specific to network environments corresponding to each of said plurality of infrastructure observability systems.

According to exemplary embodiments, the method may further include: training the AI LLM based on the predefined rules thereby fine tuning the AI LLM implemented for generating the new code; and automatically correcting, by implementing the trained AI LLM, the environments fully controlled by the new code in response to the cloud financial operations management based metrics and alerts data.

According to exemplary embodiments, the method may further include: implementing a drift detection algorithm to detect changes between the new code and the code received from the originating code repository; and automatically generating a report corresponding to the drift.

According to exemplary embodiments, the method may further include: determining that an impact of implementing the detected changes based on the generated report in correcting the environments associated with the cloud on overall network environment is below a preconfigured threshold value; automatically merging the new code onto a continuous integration/continuous deployment (CI/CD) process (pipeline); and automatically triggering, in response to merging, the CI/CD process to automatically track additional code changes in the environments associated with the cloud.

According to exemplary embodiments, the method may further include: determining that an impact of implementing the detected changes based on the generated report in correcting the environments associated with the cloud on overall network environment is equal to or more than a preconfigured threshold value; automatically generating an electronic notification and transmitting the electronic notification along with the generated report to a user; receiving user input data indicating approval of the detected changes based on the generated report; merging the new code onto a CI/CD process; automatically triggering, in response to merging, the CI/CD process to automatically track additional code changes in the environments associated with the cloud; and creating a feedback loop with said determining step, automatically generating an electronic notification step, receiving user input step indicating approval, merging the new code step, and automatically triggering the CI/CD process step for fine tuning and training the AI LLM for future implementation in automatically correcting future problems of the environments associated with the cloud.

According to exemplary embodiments, the method may further include: determining that an impact of implementing the detected changes based on the generated report in correcting the environments associated with the cloud on overall network environment is equal to or more than a preconfigured threshold value; automatically generating an electronic notification and transmitting the electronic notification along with the generated report to a user; receiving user input data indicating disapproval of the detected changes based on the generated report; receiving user input data indicating modified new code; merging the modified new code onto a CI/CD process; automatically triggering, in response to merging, the CI/CD process to automatically track additional code changes in the environments associated with the cloud; and creating a feedback loop with said determining step, automatically generating an electronic notification step, receiving user input step indicating disapproval, receiving user input data step indicating modified new code, merging the modified new code step, and automatically triggering the CI/CD process step for fine tuning and training the AI LLM for future implementation in automatically correcting future problems of the environments associated with the cloud.

According to exemplary embodiments, a system for automating cloud financial operations management optimizations is disclosed. The system may include: a processor; and a memory operatively connected to the processor via a communication interface, the memory storing computer readable instructions, when executed, may cause the processor to: implement a cloud financial operations management module; establish a communication link among the cloud financial operations management module, a plurality of infrastructure observability systems, and a plurality of IaaC systems of record via a communication interface; trigger the cloud financial operations management module through events from the infrastructure observability systems on cloud financial operations management based metrics and alerts data identifying environments to be corrected associated with a cloud; identify, in response to triggering, IaaC code's originating code repository and related materials through corresponding systems of record; implement an AI LLM to automatically generate new code specific to the environments to be corrected associated with the cloud based on predefined rules received from a rule database and code received from the originating code repository; and automatically correct the environments associated with the cloud by implementing the new code.

According to exemplary embodiments, in implementing the AI LLM, the processor may be further configured to: implement a Generative AI LLM by the cloud financial operations management module to write corresponding new code specific to network environments corresponding to each of said plurality of infrastructure observability systems.

According to exemplary embodiments, the processor may be further configured to: train the AI LLM based on the predefined rules thereby fine tuning the AI LLM implemented for generating the new code; and automatically correct, by implementing the trained AI LLM, the environments fully controlled by the new code in response to the cloud financial operations management based metrics and alerts data.

According to exemplary embodiments, the processor may be further configured to: implement a drift detection algorithm to detect changes between the new code and the code received from the originating code repository; and automatically generate a report corresponding to the drift.

According to exemplary embodiments, the processor may be further configured to: determine that an impact of implementing the detected changes based on the generated report in correcting the environments associated with the cloud on overall network environment is below a preconfigured threshold value; automatically merge the new code onto a CI/CD process; and automatically trigger, in response to merging, the CI/CD process to automatically track additional code changes in the environments associated with the cloud.

According to exemplary embodiments, the processor may be further configured to: determine that an impact of implementing the detected changes based on the generated report in correcting the environments associated with the cloud on overall network environment is equal to or more than a preconfigured threshold value; automatically generate an electronic notification and transmit the electronic notification along with the generated report to a user; receive user input data indicating approval of the detected changes based on the generated report; merge the new code onto a CI/CD process; automatically trigger, in response to merging, the CI/CD process to automatically track additional code changes in the environments associated with the cloud; and create a feedback loop with said determining step, automatically generate an electronic notification step, receive user input step indicating approval, merge the new code step, and automatically trigger the CI/CD process step for fine tuning and training the AI LLM for future implementation in automatically correcting future problems of the environments associated with the cloud.

According to exemplary embodiments, the processor may be further configured to: determine that an impact of implementing the detected changes based on the generated report in correcting the environments associated with the cloud on overall network environment is equal to or more than a preconfigured threshold value; automatically generate an electronic notification and transmit the electronic notification along with the generated report to a user; receive user input data indicating disapproval of the detected changes based on the generated report; receive user input data indicating modified new code; merge the modified new code onto a CI/CD process; automatically trigger, in response to merging, the CI/CD process to automatically track additional code changes in the environments associated with the cloud; and create a feedback loop with said determining step, automatically generate an electronic notification step, receive user input step indicating disapproval, receive user input data step indicating modified new code, merge the modified new code step, and automatically trigger the CI/CD process step for fine tuning and training the AI LLM for future implementation in automatically correcting future problems of the environments associated with the cloud.

According to exemplary embodiments, a non-transitory computer readable medium configured to store instructions for automating cloud financial operations management optimizations is disclosed. The instructions, when executed, may cause a processor to perform the following: implementing a cloud financial operations management module; establishing a communication link among the cloud financial operations management module, a plurality of infrastructure observability systems, and a plurality of IaaC systems of record via a communication interface; triggering the cloud financial operations management module through events from the infrastructure observability systems on cloud financial operations management based metrics and alerts data identifying environments to be corrected associated with a cloud; identifying, in response to triggering, IaaC code's originating code repository and related materials through corresponding systems of record; implementing an AI LLM to automatically generate new code specific to the environments to be corrected associated with the cloud based on predefined rules received from a rule database and code received from the originating code repository; and automatically correcting the environments associated with the cloud by implementing the new code.

According to exemplary embodiments, in implementing the AI LLM, the instructions, when executed, may cause the processor to further perform the following: implementing a Generative AI LLM by the cloud financial operations management module to write corresponding new code specific to network environments corresponding to each of said plurality of infrastructure observability systems.

According to exemplary embodiments, the instructions, when executed, may cause the processor to further perform the following: training the AI LLM based on the predefined rules thereby fine tuning the AI LLM implemented for generating the new code; and automatically correcting, by implementing the trained AI LLM, the environments fully controlled by the new code in response to the cloud financial operations management based metrics and alerts data.

According to exemplary embodiments, the instructions, when executed, may cause the processor to further perform the following: implementing a drift detection algorithm to detect changes between the new code and the code received from the originating code repository; and automatically generating a report corresponding to the drift.

According to exemplary embodiments, the instructions, when executed, may cause the processor to further perform the following: determining that an impact of implementing the detected changes based on the generated report in correcting the environments associated with the cloud on overall network environment is below a preconfigured threshold value; automatically merging the new code onto a CI/CD process; and automatically triggering, in response to merging, the CI/CD process to automatically track additional code changes in the environments associated with the cloud.

According to exemplary embodiments, the instructions, when executed, may cause the processor to further perform the following: determining that an impact of implementing the detected changes based on the generated report in correcting the environments associated with the cloud on overall network environment is equal to or more than a preconfigured threshold value; automatically generating an electronic notification and transmitting the electronic notification along with the generated report to a user; receiving user input data indicating approval of the detected changes based on the generated report; merging the new code onto a CI/CD process; automatically triggering, in response to merging, the CI/CD process to automatically track additional code changes in the environments associated with the cloud; and creating a feedback loop with said determining step, automatically generating an electronic notification step, receiving user input step indicating approval, merging the new code step, and automatically triggering the CI/CD process step for fine tuning and training the AI LLM for future implementation in automatically correcting future problems of the environments associated with the cloud.

According to exemplary embodiments, the instructions, when executed, may cause the processor to further perform the following: determining that an impact of implementing the detected changes based on the generated report in correcting the environments associated with the cloud on overall network environment is equal to or more than a preconfigured threshold value; automatically generating an electronic notification and transmitting the electronic notification along with the generated report to a user; receiving user input data indicating disapproval of the detected changes based on the generated report; receiving user input data indicating modified new code; merging the modified new code onto a CI/CD process; automatically triggering, in response to merging, the CI/CD process to automatically track additional code changes in the environments associated with the cloud; and creating a feedback loop with said determining step, automatically generating an electronic notification step, receiving user input step indicating disapproval, receiving user input data step indicating modified new code, merging the modified new code step, and automatically triggering the CI/CD process step for fine tuning and training the AI LLM for future implementation in automatically correcting future problems of the environments associated with the cloud.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
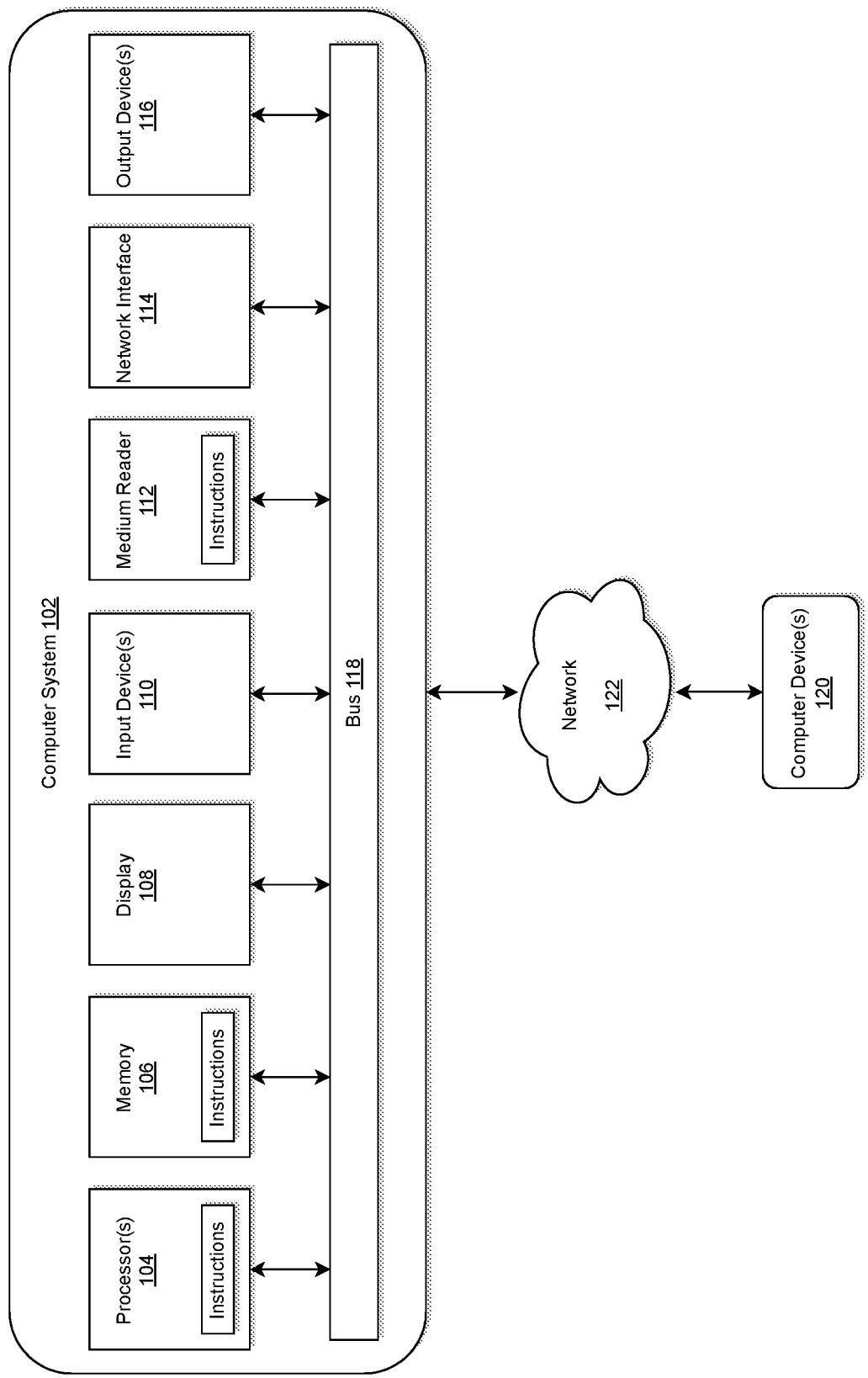
FIG. 1 illustrates a computer system for implementing a platform, language, database, and cloud agnostic cloud financial operations management module configured to automate cloud financial operations management through Generative AI for cloud infrastructure environments described as code in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic cloud financial operations management module configured to automate cloud financial operations management through Generative AI for cloud infrastructure environments described as code in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the cloud financial operations management module implemented by the system 100 may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the cloud financial operations management module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
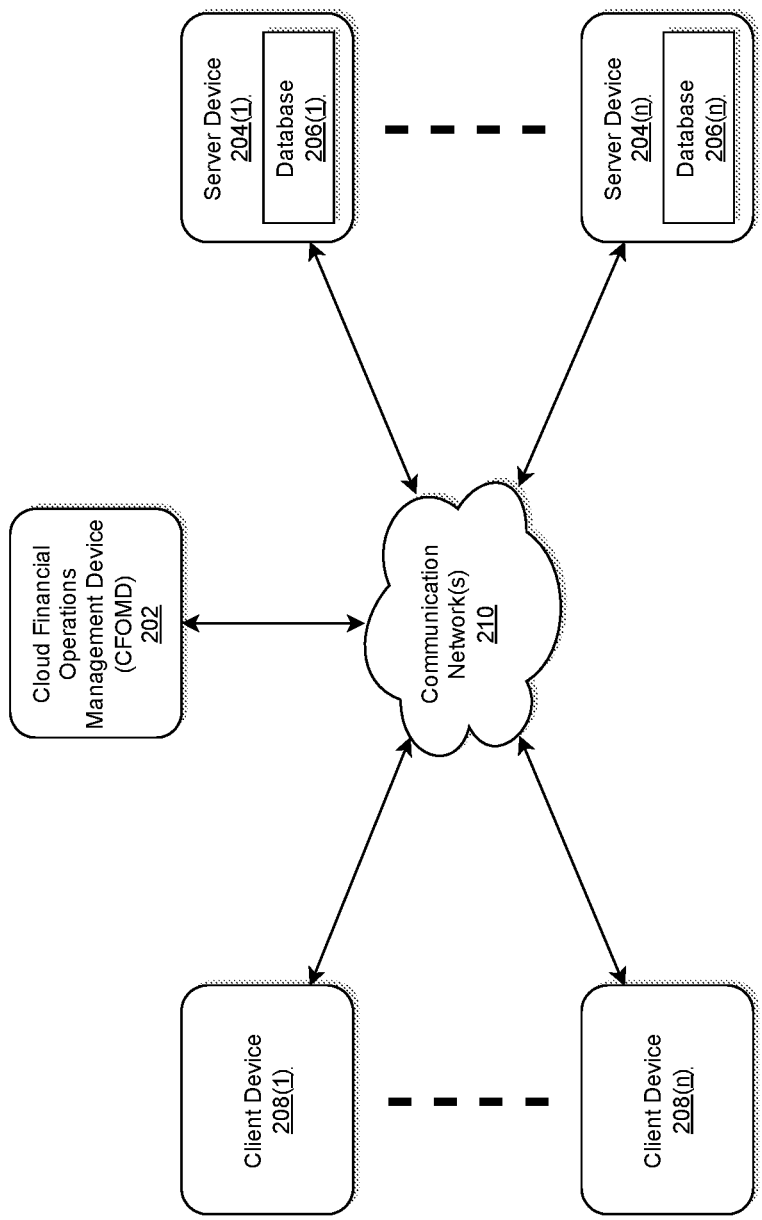
FIG. 2 illustrates an exemplary diagram of a network environment with a platform, language, database, and cloud agnostic cloud financial operations management device in accordance with an exemplary embodiment.

Referring to FIG. 2, a schematic of an exemplary network environment 200 for implementing a language, platform, database, and cloud agnostic cloud financial operations management device (CFOMD) of the instant disclosure is illustrated.

According to exemplary embodiments, the above-described problems associated with conventional tools may be overcome by implementing an CFOMD 202 as illustrated in FIG. 2 that may be configured for implementing a platform, language, database, and cloud agnostic cloud financial operations management module configured to automate cloud financial operations management through Generative AI for cloud infrastructure environments described as code, but the disclosure is not limited thereto.

For example, according to exemplary embodiments, the above-described problems associated with conventional tools may be overcome by implementing an CFOMD 202 as illustrated in FIG. 2 that may be configured for implementing a platform, language, database, and cloud agnostic cloud financial operations management module configured to dynamically and automatically fix environments fully controlled by code in response to cloud financial operations management related alerts; perform these processes across multiple clouds as it leverages the power of the Generative AI LLMs to write the code specific to these clouds; reduce the time and effort for the developers to fix the cloud financial operations management related alerts/alarms; define custom rules thereby fine tuning of the LLMs used for this purpose to have accurate code generation, etc., but the disclosure is not limited thereto.

The CFOMD 202 may have one or more computer system 102s, as described with respect to FIG. 1, which in aggregate provide the necessary functions.

The CFOMD 202 may store one or more applications that can include executable instructions that, when executed by the CFOMD 202, cause the CFOMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CFOMD 202 itself, may be located in virtual server(s) running in a cloud-based computing environment rather than being tied to one or more specific physical network computing devices. Also, the application(s) may be running in one or more virtual machines (VMs) executing on the CFOMD 202. Additionally, in one or more embodiments of this technology, virtual machine(s) running on the CFOMD 202 may be managed or supervised by a hypervisor.

In the network environment 200 of FIG. 2, the CFOMD 202 is coupled to a plurality of server devices 204(1)-204(n) that hosts a plurality of databases 206(1)-206(n), and also to a plurality of client devices 208(1)-208(n) via communication network(s) 210. A communication interface of the CFOMD 202, such as the network interface 114 of the computer system 102 of FIG. 1, operatively couples and communicates between the CFOMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CFOMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CFOMD 202 may be a standalone device or integrated with one or more other devices or apparatuses, such as one or more of the server devices 204(1)-204(n), for example. In one particular example, the CFOMD 202 may be hosted by one of the server devices 204(1)-204(n), and other arrangements are also possible. Moreover, one or more of the devices of the CFOMD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CFOMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CFOMD 202 that may efficiently provide a platform for implementing a platform, language, database, and cloud agnostic cloud financial operations management module configured to automate cloud financial operations management through Generative AI for cloud infrastructure environments described as code, but the disclosure is not limited thereto, but the disclosure is not limited thereto.

For example, according to exemplary embodiments, the client devices 208(1)-208(n) in this example may include any type of computing device that can facilitate the implementation of the CFOMD 202 that may efficiently provide a platform for implementing a platform, language, database, and cloud agnostic cloud financial operations management module configured to dynamically and automatically fix environments fully controlled by code in response to cloud financial operations management related alerts; perform these processes across multiple clouds as it leverages the power of the Generative AI LLMs to write the code specific to these clouds; reduce the time and effort for the developers to fix the cloud financial operations management related alerts/alarms; define custom rules thereby fine tuning of the LLMs used for this purpose to have accurate code generation, etc., but the disclosure is not limited thereto.

The client devices 208(1)-208(n) may run interface applications, such as standard web browsers or standalone client applications, which may provide an interface to communicate with the CFOMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CFOMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the CFOMD 202, the server devices 204(1)-204(n), or the client devices 208(1)-208(n), for example, may be configured to operate as virtual instances on the same physical machine. For example, one or more of the CFOMD 202, the server devices 204(1)-204(n), or the client devices 208(1)-208(n) may operate on the same physical device rather than as separate devices communicating through communication network(s) 210. Additionally, there may be more or fewer CFOMDs 202, server devices 204(1)-204(n), or client devices 208(1)-208(n) than illustrated in FIG. 2. According to exemplary embodiments, the CFOMD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
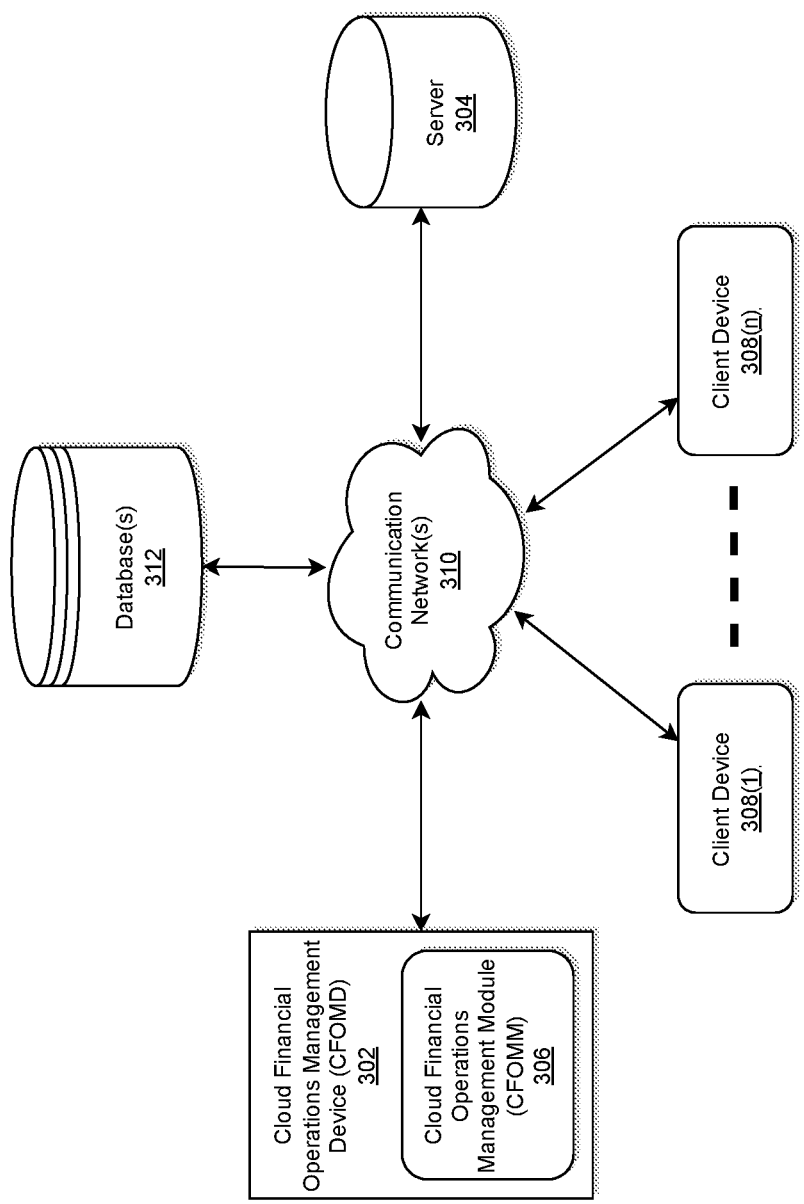
FIG. 3 illustrates a system diagram for implementing a platform, language, database, and cloud agnostic cloud financial operations management device having a platform, language, database, and cloud agnostic cloud financial operations management module in accordance with an exemplary embodiment.

FIG. 3 illustrates a system diagram for implementing a platform, language, and cloud agnostic CFOMD having a platform, language, database, and cloud agnostic cloud financial operations management module (CFOMM) in accordance with an exemplary embodiment.

As illustrated in FIG. 3, the system 300 may include an CFOMD 302 within which an CFOMM 306 is embedded, a server 304, a database(s) 312, a plurality of client devices 308(1) . . . 308(n), and a communication network 310.

According to exemplary embodiments, the CFOMD 302 including the CFOMM 306 may be connected to the server 304, and the database(s) 312 via the communication network 310. The CFOMD 302 may also be connected to the plurality of client devices 308(1) . . . 308(n) via the communication network 310, but the disclosure is not limited thereto. The database(s) 312 may include rule database.

According to exemplary embodiment, the CFOMD 302 is described and shown in FIG. 3 as including the CFOMM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the CFOMM 306 may be configured to receive real-time feed of data from the plurality of client devices 308(1) . . . 308(n) and secondary sources via the communication network 310.

As may be described below, the CFOMM 306 may be configured to: establish a communication link among the cloud financial operations management module, a plurality of infrastructure observability systems, and a plurality of IaaC systems of record via a communication interface; trigger the cloud financial operations management module through events from the infrastructure observability systems on cloud financial operations management based metrics and alerts data identifying environments to be corrected associated with a cloud; identify, in response to triggering, IaaC code's originating code repository and related materials through corresponding systems of record; implement an AI LLM to automatically generate new code specific to the environments to be corrected associated with the cloud based on predefined rules received from a rule database and code received from the originating code repository; and automatically correct the environments associated with the cloud by implementing the new code, but the disclosure is not limited thereto.

The plurality of client devices 308(1) . . . 308(n) are illustrated as being in communication with the CFOMD 302. In this regard, the plurality of client devices 308(1) . . . 308(n) may be "clients" (e.g., customers) of the CFOMD 302 and are described herein as such. Nevertheless, it is to be known and understood that the plurality of client devices 308(1) . . . 308(n) need not necessarily be "clients" of the CFOMD 302, or any entity described in association therewith herein. Any additional or alternative relationship may exist between either or both of the plurality of client devices 308(1) . . . 308(n) and the CFOMD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the CFOMD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CFOMD 302 may be the same or similar to the CFOMD 202 as described with respect to FIG. 2, including any features or combination of features described with respect thereto.

Figure 4:
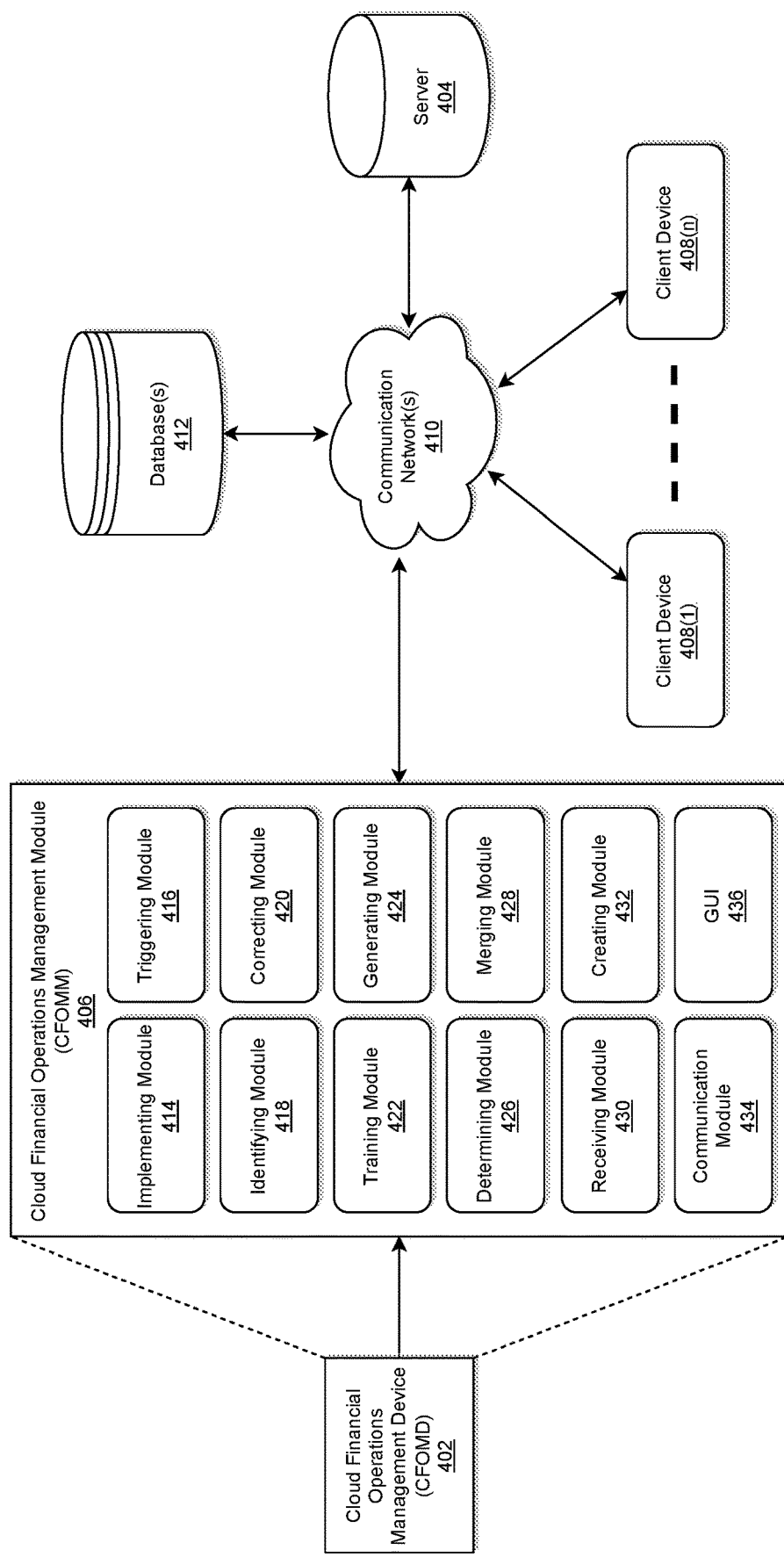
FIG. 4 illustrates a system diagram for implementing a platform, language, database, and cloud agnostic cloud financial operations management module of FIG. 3 in accordance with an exemplary embodiment.

FIG. 4 illustrates a system diagram for implementing a platform, language, database, and cloud agnostic CFOMM of FIG. 3 in accordance with an exemplary embodiment.

According to exemplary embodiments, the system 400 may include a platform, language, database, and cloud agnostic CFOMD 402 within which a platform, language, database, and cloud agnostic CFOMM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the CFOMD 402 including the CFOMM 406 may be connected to the server 404 and the database(s) 412 via the communication network 410. The CFOMD 402 may also be connected to the plurality of client devices 408(1)-408(n) via the communication network 410, but the disclosure is not limited thereto. The CFOMM 406, the server 404, the plurality of client devices 408(1)-408(n), the database(s) 412, the communication network 410 as illustrated in FIG. 4 may be the same or similar to the CFOMM 306, the server 304, the plurality of client devices 308(1)-308(n), the database(s) 312, the communication network 310, respectively, as illustrated in FIG. 3.

According to exemplary embodiments, the database agnostic CFOMM 406 implements the Generative AI to generate text, images, or other media, using generative models. According to exemplary embodiments, the Generative AI models learn the patterns and structure of their input training data and then generate new data that has similar characteristics.

According to exemplary embodiments, the CFOMM 406 as implemented herein may be configured to automate cloud financial operations management through Generative AI for cloud infrastructure environments described as code may provide an advanced operational framework for integrating technology, finance, and business together to drive financial accountability and accelerating business value realization through cloud transformation. For example, the CFOMM 406 as implemented herein may enable enterprises to drive financial accountability and maximize business value; help understand the complexity and challenges to traditional IT financial management; help to identify the building blocks and key success metrics for business value realization, etc., but the disclosure is not limited thereto.

Moreover, the CFOMM 406 may be configured to automate cloud financial operations management through Generative AI for cloud infrastructure environments described as code, but the disclosure is not limited thereto. For example, the CFOMM 406 may be configured to dynamically and automatically fix environments fully controlled by code in response to cloud financial operations management related alerts; perform these processes across multiple clouds as it leverages the power of the Generative AI LLMs to write the code specific to these clouds; reduce the time and effort for the developers to fix the cloud financial operations management related alerts/alarms; define custom rules thereby fine tuning of the LLMs used for this purpose to have accurate code generation, etc., but the disclosure is not limited thereto.

According to exemplary embodiments, the data generated by the inventive concepts implemented by the CFOMM 406 as disclosed herein can be shared with other downstream applications via API or data share algorithms for analytics and machine learning and business intelligence dashboards according to consumer work-load needs.

Details of the CFOMM 406 is provided below with corresponding modules.

According to exemplary embodiments, as illustrated in FIG. 4, the CFOMM 406 may include an implementing module 414, a triggering module 416, an identifying module 418, a correcting module 420, a training module 422, a generating module 424, a determining module 426, a merging module 428, a receiving module 430, a creating module 432, a communication module 434, and a GUI 436. According to exemplary embodiments, interactions and data exchange among these modules included in the CFOMM 406 provide the advantageous effects of the disclosed invention. Functionalities of each module of FIG. 4 may be described in detail below with reference to FIGS. 4-7.

According to exemplary embodiments, each of the implementing module 414, triggering module 416, identifying module 418, correcting module 420, training module 422, generating module 424, determining module 426, merging module 428, receiving module 430, creating module 432, and the communication module 434 of the CFOMM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, triggering module 416, identifying module 418, correcting module 420, training module 422, generating module 424, determining module 426, merging module 428, receiving module 430, creating module 432, and the communication module 434 of the CFOMM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the implementing module 414, triggering module 416, identifying module 418, correcting module 420, training module 422, generating module 424, determining module 426, merging module 428, receiving module 430, creating module 432, and the communication module 434 of the CFOMM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the CFOMM 406 of FIG. 4 may also be implemented by Cloud based deployment.

According to exemplary embodiments, each of the implementing module 414, triggering module 416, identifying module 418, correcting module 420, training module 422, generating module 424, determining module 426, merging module 428, receiving module 430, creating module 432, and the communication module 434 of the CFOMM 406 of FIG. 4 may be called via corresponding API, but the disclosure is not limited thereto. For example, calls may also be made using Event based message interfaces in addition to APIs.

According to exemplary embodiments, the process implemented by the CFOMM 406 may be executed via the communication module 434 and the communication network 410, which may comprise plural networks as described above. For example, in an exemplary embodiment, the various components of the CFOMM 406 may communicate with the server 404, and the database(s) 412 via the communication module 434 and the communication network 410 and the results may be displayed onto the GUI 436. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
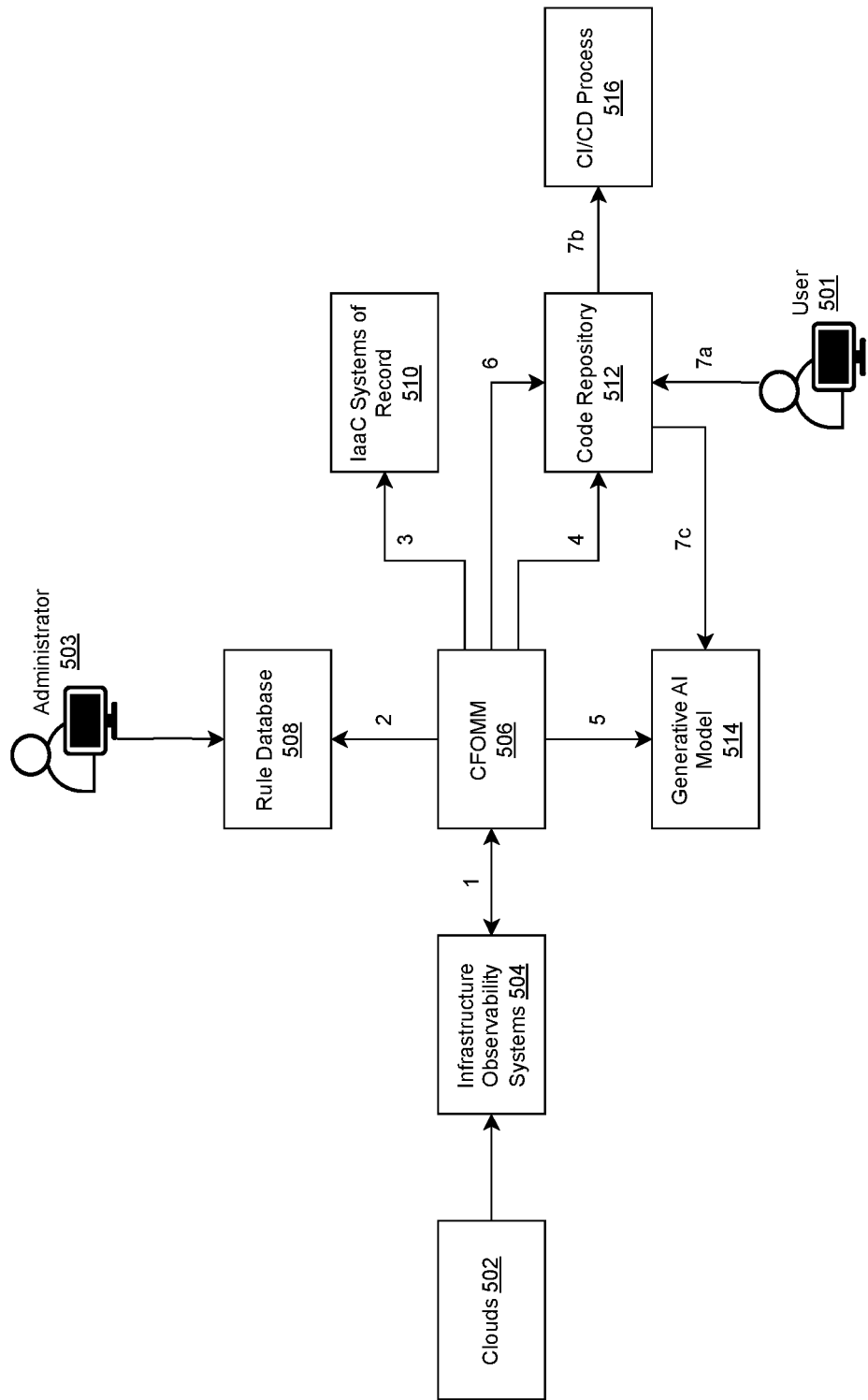
FIG. 5 illustrates an exemplary architecture diagram implemented by the platform, language, database, and cloud agnostic cloud financial operations management module of FIG. 4 for automating cloud financial operations management through Generative AI for cloud infrastructure environments described as code in accordance with an exemplary embodiment.

FIG. 5 illustrates an exemplary architecture diagram 500 implemented by the platform, language, database, and cloud agnostic CFOMM 406 of FIG. 4 for automating cloud financial operations management through Generative AI for cloud infrastructure environments described as code in accordance with an exemplary embodiment.

As illustrated in FIG. 5, a plurality of clouds 502 are operatively connected with infrastructure observability systems 504. The infrastructure observability systems 504 may be bidirectionally communicate with the CFOMM 506 for data exchange. According to exemplary embodiments, the CFOMM 506 may be operatively connected with a rule database 508, IaaC systems of record 510, code repository 512. The code repository 412 may be operatively connected with the Generative AI model 514 and a CI/CD process (pipeline) 516. An administrator 503 may provide preset/preconfigured rules and store the rules onto the rule database 508.

For example, as illustrated in FIG. 5, the plurality of clouds 502 send data to the infrastructure observability systems 504.

According to exemplary embodiments, at sequence 1, the CFOMM 506 may be triggered by alarms/alerts data received from the infrastructure observability systems 504 corresponding to the plurality of clouds 502. Alternatively, the CFOMM 506 may pull information data regarding the plurality of clouds 502 from the infrastructure observability systems 504. According to exemplary embodiments, the CFOMM 506 may be triggered through events from the infrastructure observability systems 504 on cloud financial operations management based metrics and alerts data identifying environments to be corrected associated with a cloud among the plurality of clouds 502.

At sequence 2, the CFOMM 506 may check rules and receive predefined or preconfigurable rules from the rule database 508 to be utilized for generating codes. At sequence 3, the CFOMM 506 matches to IaaC stack identifier and identifies the IaaC code's originating stack and related materials through the relevant IaaC systems of record 510 that it can connect to, and thereby identifying the code repository 512. At sequence 4, the CFOMM 506 obtains the code from the identified code repository 512.

According to exemplary embodiments, at sequence 5, the CFOMM 506 then implements the Generative AI LLMs (i.e., Generative AI Model 415) to generate the code that can fix the alert and creates a new branch and creates a commit and a pull request. This follows the plugin pattern for the foundational models to augment and execute outputs. For example, at sequence 6, the CFOMM 506 creates a branch with suggestions and reports and raise a peer review notification for user 501 to approve or deny the suggestions and reports. The suggestions and reports may be stored onto the code repository 512. For example, at sequence 7a, the user 501 provide inputs regarding approval or denial of the suggestions and reports and store such inputs on to the code repository. Alternatively, the suer 501 may modify the suggestions and reports and store the modifications onto the code repository 512.

For some of the lower impact fixes, these are automatically merged and the downstream CI/CD process 516 is triggered at sequence 7b. According to exemplary embodiments, drift detection algorithm may be implemented by the CFOMM 506 as part of the analysis to detect changes between original code and received code.

According to exemplary embodiments, for more advanced fixes, the user 501 is notified of the change and the user 501 can improve/approve the change and then in turn triggers the CI/CD process 516 to ensure the fully IaaC environment is properly managed, and the changes are tracked automatically.

A feedback loop is implemented with Reinforcement Learning from Human Feedback (RLHF) triggers to the foundational model based on the approval/rejection action and comments from the user 501 in sequence 7a thereby better tuning the model for future uses. In machine learning, RLHF or reinforcement learning from human preferences is a technique that trains a "Generative AI MML" directly from human feedback and uses the model as a function to optimize code generation using Reinforcement Learning (RL) through an optimization algorithm.

Figure 6:
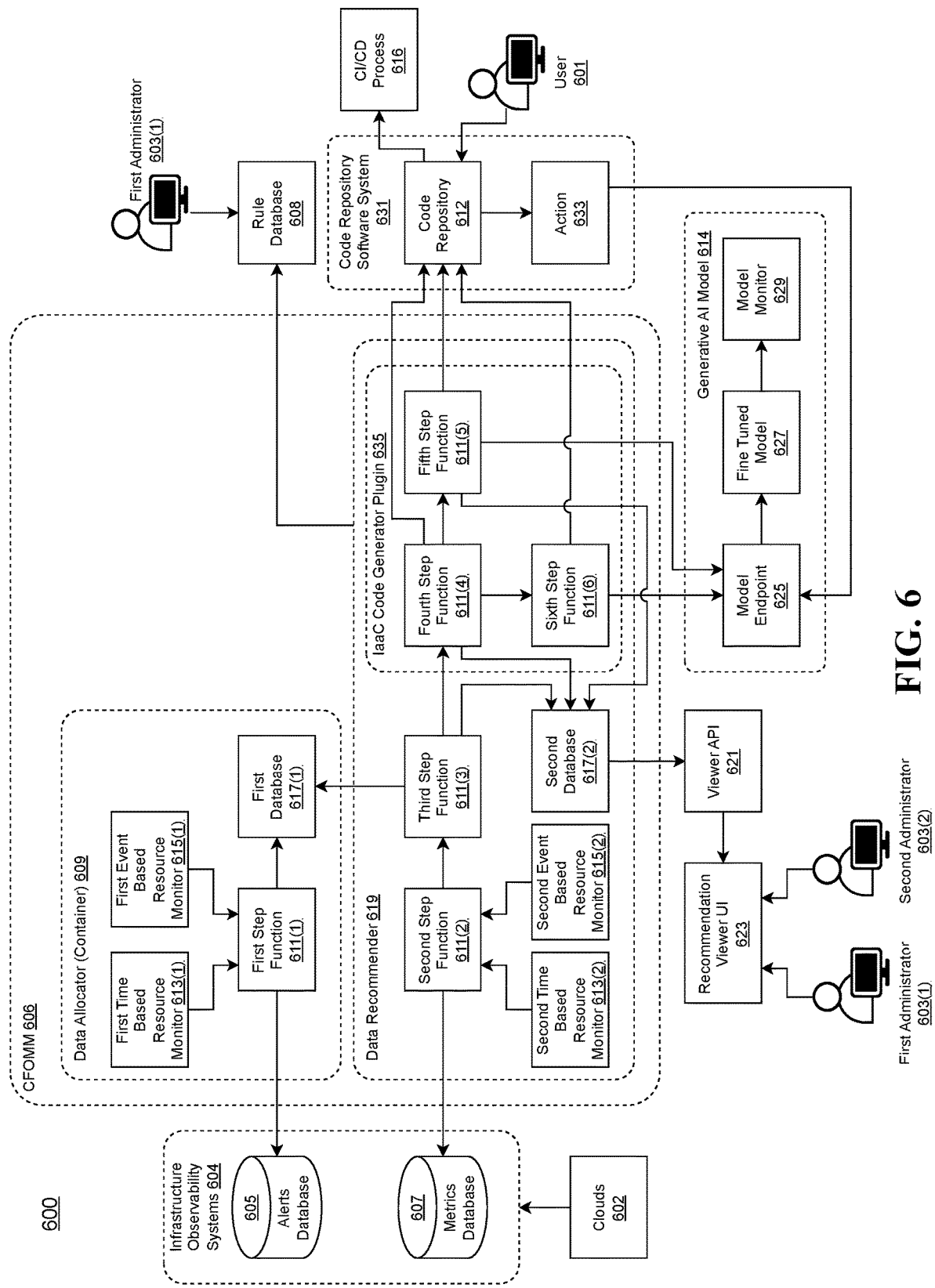
FIG. 6 illustrates more detailed view of the exemplary architecture diagram of FIG. 5 implemented by the platform, language, database, and cloud agnostic cloud financial operations management module of FIG. 4 for automating cloud financial operations management through Generative AI for cloud infrastructure environments described as code in accordance with an exemplary embodiment.

FIG. 6 illustrates more detailed view of the exemplary architecture diagram of FIG. 5 implemented by the platform, language, database, and cloud agnostic CFOMM 406, 506, 606 for automating cloud financial operations management through Generative AI for cloud infrastructure environments described as code in accordance with an exemplary embodiment.

As illustrated in FIG. 6, the exemplary architecture diagram 600 may include infrastructure observability systems 604 including an alerts database 605 and a metrics database 607; a plurality of clouds 602 operative connected to the infrastructure observability systems 604, a CFOMM 606, recommendation viewer UI 623, viewer API 621, a generative AI model 614, a code repository software system 631, a rule database 608, a CI/CD process (pipeline) 616.

According to exemplary embodiments, the CFOMM 606 may include a data allocator (container) 609 and a data recommender 619. The data allocator (container) 609 may include a first time based resource monitor 613(1), a first event based resource monitor 615 (1), a first step function 611(1) block, a first database 617(1). The data recommender 619 may include a second step function 611(2) block, a third step function 611(3) block, a second time based resource monitor 613(2), a second event based resource monitor 615 (2) and a second database 617(2). The data recommender 619 may also include an IaaC code generator plugin 635 that may include a fourth step function 611(4) block, a fifth step function 611(5) block and a sixth step function 611(6) block.

According to exemplary embodiments, the plurality of clouds 602 may send data to the infrastructure observability systems 604. Alerts/alarms data may be stored onto the alerts database 605 and metrics data may be stored onto the metrics database 607. The first time based monitor 613(1) and the first event based resource monitor 615(1) may monitor events and trigger the first step function 611(1) to pull information from the alerts database 605 and store the pulled information onto the first database 617(1). The first step function 611(1) may be responsible for financial telemetry, extractor, and allocator.

Similarly, the second time based monitor 613(2) and the second event based resource monitor 615(2) may monitor events and trigger the second step function 611(2) to pull information from the metrics database 607 and triggers analysis by the third step function 611(3). The second step function 611(2) may be responsible for tracking infra usage and the third step function 611(3) may be responsible for analyzing overlay costs and rules for cloud financial operations manage and prioritize and classify corresponding fixes. The analysis information output from the third step function 611(3) along with the pulled information from the metrics database 607 may also be stored onto the first database 617(1).

According to exemplary embodiments, data recommender 619 may check rules from the rule database provided by the first administrator 603(1). The third step function 611(3) matches and generates IaaC code and recommendation and update analysis state is stored onto the second database 617(2) which stores cloud financial operations management recommended fixes. The IaaC code generator plugin 635 compares the code. The fourth step function 611(4) checks for any drift in the code based on the sixth step function 611(6) which triggers drift detection and create recommended code fixes for storing onto the second database 617(2). Accordingly, the fourth step function 611(4) creates code recommendation and triggers fifth step function 611(5) which generates code recommendations and fixes in a new branch. The fourth step function 611(4) then update any traces and stores onto the second database 617(2). The fifth step function 611(5) creates recommended code fixes by utilizing the model endpoint 625 of the Generative AI model 614. The fifth step function 611(5) creates code recommendation branch and a report for peer review and stores that the recommended code and the report on the code repository 612 of the code repository software system 631. The fifth step function 611(5) also stores the recommended fixes onto the second database 617(2) for review by the second administrator 603(2).

According to exemplary embodiments, action 612 within the code repository software system 631 may trigger RLHF based on approval and comment received from user 601 to generate a fine tuned model 627. The model monitor 629 may be utilized to monitor the fine tuned model. Based on approval based on rules, the CI/CD process 616 may be triggered.

According to exemplary embodiments, the First administrator 603(1) and the second administrator 603(2) may utilize the recommendation viewer UI 623 to view cloud financial operations management recommendation from second database 617(2) via the viewer API 621.

Figure 7:
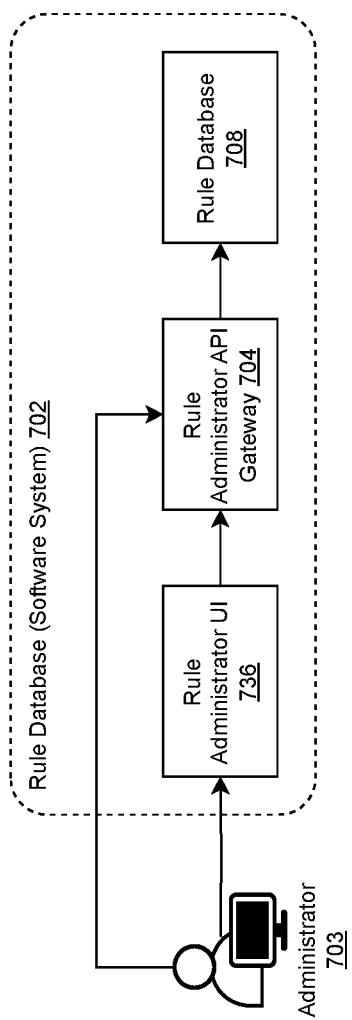
FIG. 7 illustrates an exemplary rule database of FIGS. 5 and 6 as implemented by the platform, language, database, and cloud agnostic cloud financial operations management module of FIG. 4 in accordance with an exemplary embodiment.

FIG. 7 illustrates an exemplary architecture 700 for a rule database of FIGS. 5 and 6 as implemented by the platform, language, database, and cloud agnostic CFOMM 406, 506, and 606 in accordance with an exemplary embodiment. As illustrated in FIG. 7, the exemplary architecture 700 includes rule database (software system) 702 that may include a rule administrator user interface (UI) 736, a rule administrator API gateway 704 and a rule database 708. The administrator 703 may utilize a computing device to utilize the rule administrator UI 736 and the rule administrator API gateway 704. The administrator 703 may perform CRUD (Create, Read, Update, Delete) operations by utilizing the rule administrator UI 736 and the rule administrator API gateway 704 to implement a persistent storage application to store data related to rules onto the rule database 708. For example, the administrator 703 can create rules, update rules, delete rules, list rules and describe rules to be utilized by the Generative AI LLM described above to generate new code to automate cloud financial operations management through Generative AI for cloud infrastructure environments described as code.

For example, referring back to FIGS. 4-7, the implementing module 414 may be configured to implement the CFOMM 406, 506, 606 within a communication network 410. The communication module 434 may be configured to establish a communication link among the CFOMM 406, 506, 606, a plurality of infrastructure observability systems 504, 604, and a plurality of IaaC systems of record 510 via a communication interface.

According to exemplary embodiments, the triggering module 416 may be configured to trigger the CFOMM 406, 506, 606 through events from the infrastructure observability systems 504, 604 on cloud financial operations management based metrics and alerts data identifying environments to be corrected associated with a cloud 502, 602. The identifying module 418 may be configured to identify, in response to triggering, IaaC code's originating code repository 512, 612 and related materials through corresponding systems of record 510.

According to exemplary embodiments, the implementing module 414 may be further configured to implement an AI LLM (i.e., Generative AI model 514, 614) to automatically generate new code specific to the environments to be corrected associated with the cloud based on predefined rules received from a rule database 508, 608, 708 and code received from the originating code repository 512, 612. The correcting module 420 may be configured to automatically correct the environments associated with the cloud 502, 602 by implementing the new code.

According to exemplary embodiments, in implementing the AI LLM (i.e., Generative AI model 514, 614 as illustrated in FIGS. 5 and 6, respectively), the implementing module 414 may be further configured to: implement the Generative AI model 514, 614 to write corresponding new code specific to network environments corresponding to each of the plurality of infrastructure observability systems 504, 604.

According to exemplary embodiments, the training module 422 may be configured to train the AI LLM based on the predefined rules thereby fine tuning the AI LLM (i.e., fine-tuned model 627 as illustrated in FIG. 6) implemented for generating the new code. The correcting module 420 may be configured to automatically correct, by implementing the trained AI LLM (i.e., fine-tuned model 627 as illustrated in FIG. 6), the environments fully controlled by the new code in response to the cloud financial operations management based metrics data received from metrics database 607 and alerts data received from alerts database 605.

According to exemplary embodiments, the implementing module 414 may be configured to implement a drift detection algorithm to detect changes between the new code and the code received from the originating code repository 512, 612 and the generating module 424 may be configured to automatically generate a report corresponding to the drift.

According to exemplary embodiments, the determining module 426 may be further configured to determine that an impact of implementing the detected changes based on the generated report in correcting the environments associated with the cloud on overall network environment is below a preconfigured threshold value. The merging module 428 may be configured to automatically merge the new code onto a CI/CD process 516, 616. And the triggering module 422 may be configured to automatically trigger, in response to merging, the CI/CD process 516, 616 to automatically track additional code changes in the environments associated with the cloud 502, 602.

According to exemplary embodiments, the determining module 426 may be configured to determine that an impact of implementing the detected changes based on the generated report in correcting the environments associated with the cloud on overall network environment is equal to or more than a preconfigured threshold value; the generating module 424 may be configured to automatically generate an electronic notification and transmit the electronic notification along with the generated report to a user 501, 601 or to the second administrator 603(2). The receiving module 430 may be configured to receive user input data indicating approval of the detected changes based on the generated report. The merging module 428 may be configured to merge the new code onto the CI/CD process 516, 616. The triggering module 416 may be configured to automatically trigger, in response to merging, the CI/CD process 516, 616 to automatically track additional code changes in the environments associated with the cloud. And the creating module 432 may be configured to create a feedback loop with said determining step, automatically generate an electronic notification step, receive user input step indicating approval, merge the new code step, and automatically trigger the CI/CD process 516, 616 step for fine tuning and training the AI LLM for future implementation in automatically correcting future problems of the environments associated with the cloud 502, 602.

According to exemplary embodiments, the determining module 426 may be configured to determine that an impact of implementing the detected changes based on the generated report in correcting the environments associated with the cloud on overall network environment is equal to or more than a preconfigured threshold value. The generating module 424 may be configured to automatically generate an electronic notification and transmit the electronic notification along with the generated report to a user 501, 601 or the second administrator 603(2). The receiving module 430 may be configured to receive user input data indicating disapproval of the detected changes based on the generated report. The receiving module 430 may be further configured to receive user input data indicating modified new code. The merging module 428 may be configured to merge the modified new code onto the CI/CD process 516, 616. The triggering module 416 may be automatically trigger, in response to merging, the CI/CD process 516, 616 to automatically track additional code changes in the environments associated with the cloud 502, 602. And the creating module 432 may be configured to create a feedback loop with the determining step, automatically generate an electronic notification step, receive user input step indicating disapproval, receive user input data step indicating modified new code, merge the modified new code step, and automatically trigger the CI/CD process 516, 616 step for fine tuning and training the AI LLM for future implementation in automatically correcting future problems of the environments associated with the cloud.

Figure 8:
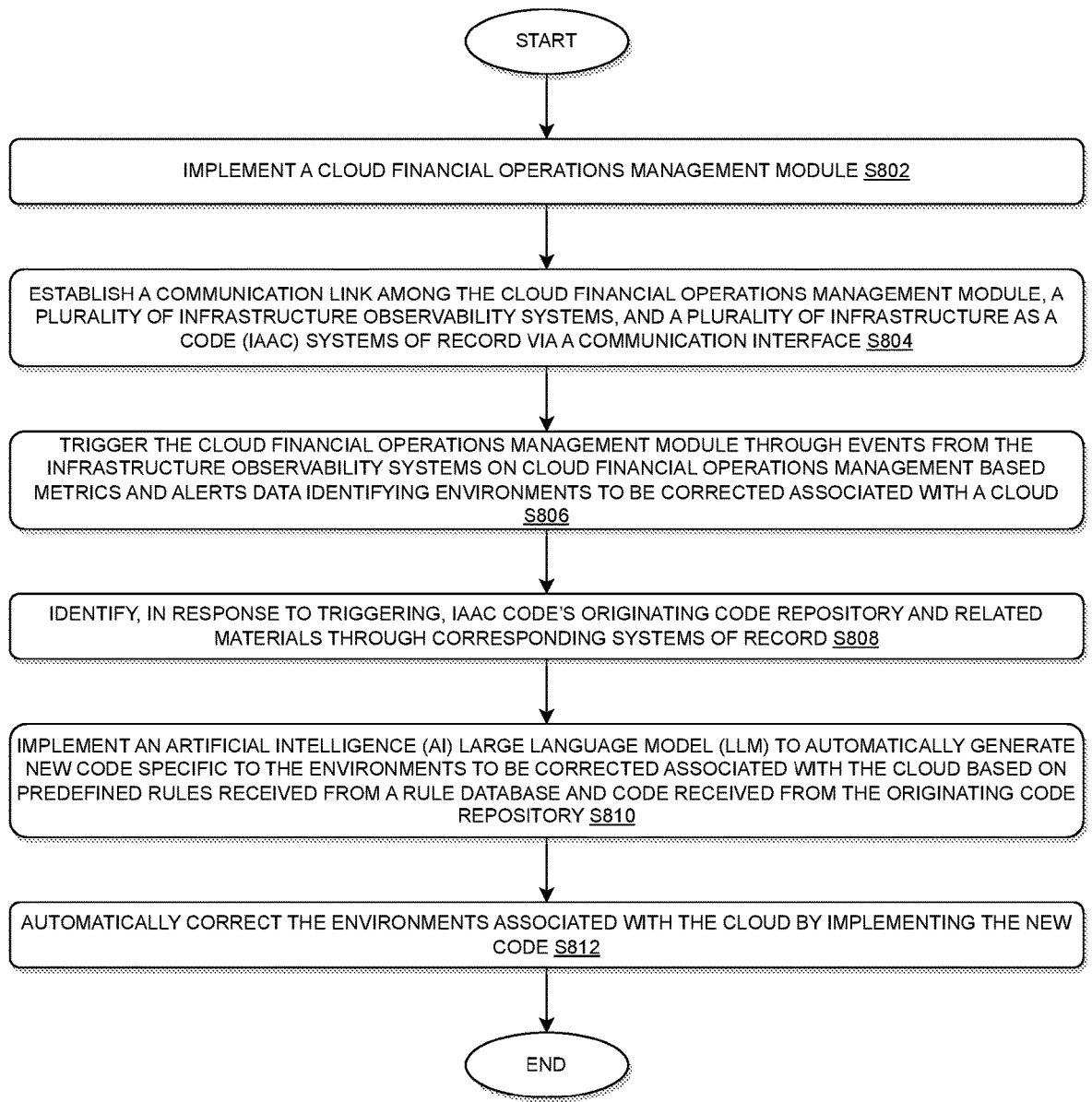
FIG. 8 illustrates an exemplary flow chart of a process implemented by the platform, language, database, and cloud agnostic cloud financial operations management module of FIG. 4 for automating cloud financial operations management through Generative AI for cloud infrastructure environments described as code in accordance with an exemplary embodiment.

FIG. 8 illustrates an exemplary flow chart of a process 800 implemented by the platform, language, database, and cloud agnostic CFOMM 408 of FIG. 4 for automating cloud financial operations management through Generative AI for cloud infrastructure environments described as code in accordance with an exemplary embodiment in accordance with an exemplary embodiment. It may be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include implementing a cloud financial operations management module.

At step S804, the process 800 may include establishing a communication link among the cloud financial operations management module, a plurality of infrastructure observability systems, and a plurality of Iaac systems of record via a communication interface.

At step S806, the process 800 may include triggering the cloud financial operations management module through events from the infrastructure observability systems on cloud financial operations management based metrics and alerts data identifying environments to be corrected associated with a cloud.

At step S808, the process 800 may include identifying, in response to triggering, IaaC code's originating code repository and related materials through corresponding systems of record.

At step S810, the process 800 may include implementing an AI LLM to automatically generate new code specific to the environments to be corrected associated with the cloud based on predefined rules received from a rule database and code received from the originating code repository.

At step S812, the process 800 may include automatically correcting the environments associated with the cloud by implementing the new code.

According to exemplary embodiments, in implementing the AI LLM, the process 800 may further include: implementing a Generative AI LLM by the cloud financial operations management module to write corresponding new code specific to network environments corresponding to each of said plurality of infrastructure observability systems.

According to exemplary embodiments, the process 800 may further include: training the AI LLM based on the predefined rules thereby fine tuning the AI LLM implemented for generating the new code; and automatically correcting, by implementing the trained AI LLM, the environments fully controlled by the new code in response to the cloud financial operations management based metrics and alerts data.

According to exemplary embodiments, the process 800 may further include: implementing a drift detection algorithm to detect changes between the new code and the code received from the originating code repository; and automatically generating a report corresponding to the drift.

According to exemplary embodiments, the process 800 may further include: determining that an impact of implementing the detected changes based on the generated report in correcting the environments associated with the cloud on overall network environment is below a preconfigured threshold value; automatically merging the new code onto a continuous integration/continuous deployment (CI/CD) process; and automatically triggering, in response to merging, the CI/CD process to automatically track additional code changes in the environments associated with the cloud.

According to exemplary embodiments, the process 800 may further include: determining that an impact of implementing the detected changes based on the generated report in correcting the environments associated with the cloud on overall network environment is equal to or more than a preconfigured threshold value; automatically generating an electronic notification and transmitting the electronic notification along with the generated report to a user; receiving user input data indicating approval of the detected changes based on the generated report; merging the new code onto a CI/CD process; automatically triggering, in response to merging, the CI/CD process to automatically track additional code changes in the environments associated with the cloud; and creating a feedback loop with said determining step, automatically generating an electronic notification step, receiving user input step indicating approval, merging the new code step, and automatically triggering the CI/CD process step for fine tuning and training the AI LLM for future implementation in automatically correcting future problems of the environments associated with the cloud.

According to exemplary embodiments, the process 800 may further include: determining that an impact of implementing the detected changes based on the generated report in correcting the environments associated with the cloud on overall network environment is equal to or more than a preconfigured threshold value; automatically generating an electronic notification and transmitting the electronic notification along with the generated report to a user; receiving user input data indicating disapproval of the detected changes based on the generated report; receiving user input data indicating modified new code; merging the modified new code onto a CI/CD process; automatically triggering, in response to merging, the CI/CD process to automatically track additional code changes in the environments associated with the cloud; and creating a feedback loop with said determining step, automatically generating an electronic notification step, receiving user input step indicating disapproval, receiving user input data step indicating modified new code, merging the modified new code step, and automatically triggering the CI/CD process step for fine tuning and training the AI LLM for future implementation in automatically correcting future problems of the environments associated with the cloud.

According to exemplary embodiments, the CFOMD 402 may include a memory (e.g., a memory 106 as illustrated in FIG. 1) which may be a non-transitory computer readable medium that may be configured to store instructions for implementing a platform, language, database, and cloud agnostic CFOMM 406 for automating cloud financial operations management optimizations as disclosed herein. The CFOMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the CFOMM 406, 506, 606 or within the CFOMD 402, may be used to perform one or more of the methods and processes as described herein. In a particular embodiment, the instructions may reside completely, or at least partially, within the memory 106, the medium reader 112, and/or the processor 104 (see FIG. 1) during execution by the CFOMD 402.

According to exemplary embodiments, the instructions, when executed, may cause a processor embedded within the CFOMM 406, 506, 606 or the CFOMD 402 to perform the following: implementing a cloud financial operations management module; establishing a communication link among the cloud financial operations management module, a plurality of infrastructure observability systems, and a plurality of IaaC systems of record via a communication interface; triggering the cloud financial operations management module through events from the infrastructure observability systems on cloud financial operations management based metrics and alerts data identifying environments to be corrected associated with a cloud; identifying, in response to triggering, IaaC code's originating code repository and related materials through corresponding systems of record; implementing an AI LLM to automatically generate new code specific to the environments to be corrected associated with the cloud based on predefined rules received from a rule database and code received from the originating code repository; and automatically correcting the environments associated with the cloud by implementing the new code. According to exemplary embodiments, the processor may be the same or similar to the processor 104 as illustrated in FIG. 1 or the processor embedded within the CFOMD 202, CFOMD 302, CFOMD 402, and CFOMM 406, 506, 606 which is the same or similar to the processor 104.

According to exemplary embodiments, in implementing the AI LLM, the instructions, when executed, may cause the processor 104 to further perform the following: implementing a Generative AI LLM by the cloud financial operations management module to write corresponding new code specific to network environments corresponding to each of said plurality of infrastructure observability systems.

According to exemplary embodiments, the instructions, when executed, may cause the processor 104 to further perform the following: training the AI LLM based on the predefined rules thereby fine tuning the AI LLM implemented for generating the new code; and automatically correcting, by implementing the trained AI LLM, the environments fully controlled by the new code in response to the cloud financial operations management based metrics and alerts data.

According to exemplary embodiments, the instructions, when executed, may cause the processor 104 to further perform the following: implementing a drift detection algorithm to detect changes between the new code and the code received from the originating code repository; and automatically generating a report corresponding to the drift.

According to exemplary embodiments, the instructions, when executed, may cause the processor 104 to further perform the following: determining that an impact of implementing the detected changes based on the generated report in correcting the environments associated with the cloud on overall network environment is below a preconfigured threshold value; automatically merging the new code onto a CI/CD process; and automatically triggering, in response to merging, the CI/CD process to automatically track additional code changes in the environments associated with the cloud.

According to exemplary embodiments, the instructions, when executed, may cause the processor 104 to further perform the following: determining that an impact of implementing the detected changes based on the generated report in correcting the environments associated with the cloud on overall network environment is equal to or more than a preconfigured threshold value; automatically generating an electronic notification and transmitting the electronic notification along with the generated report to a user; receiving user input data indicating approval of the detected changes based on the generated report; merging the new code onto a CI/CD process; automatically triggering, in response to merging, the CI/CD process to automatically track additional code changes in the environments associated with the cloud; and creating a feedback loop with said determining step, automatically generating an electronic notification step, receiving user input step indicating approval, merging the new code step, and automatically triggering the CI/CD process step for fine tuning and training the AI LLM for future implementation in automatically correcting future problems of the environments associated with the cloud.

According to exemplary embodiments, the instructions, when executed, may cause the processor 104 to further perform the following: determining that an impact of implementing the detected changes based on the generated report in correcting the environments associated with the cloud on overall network environment is equal to or more than a preconfigured threshold value; automatically generating an electronic notification and transmitting the electronic notification along with the generated report to a user; receiving user input data indicating disapproval of the detected changes based on the generated report; receiving user input data indicating modified new code; merging the modified new code onto a CI/CD process; automatically triggering, in response to merging, the CI/CD process to automatically track additional code changes in the environments associated with the cloud; and creating a feedback loop with said determining step, automatically generating an electronic notification step, receiving user input step indicating disapproval, receiving user input data step indicating modified new code, merging the modified new code step, and automatically triggering the CI/CD process step for fine tuning and training the AI LLM for future implementation in automatically correcting future problems of the environments associated with the cloud.

According to exemplary embodiments as disclosed above in FIGS. 1-8, technical improvements effected by the instant disclosure may include a platform for implementing a platform, language, database, and cloud agnostic cloud financial operations management module configured to automate cloud financial operations management through Generative AI for cloud infrastructure environments described as code, but the disclosure is not limited thereto.

For example, according to exemplary embodiments as disclosed above in FIGS. 1-8, technical improvements effected by the instant disclosure may include a platform for implementing a platform, language, database, and cloud agnostic cloud financial operations management module configured to dynamically and automatically fix environments fully controlled by code in response to cloud financial operations management related alerts; perform these processes across multiple clouds as it leverages the power of the Generative AI LLMs to write the code specific to these clouds; reduce the time and effort for the developers to fix the cloud financial operations management related alerts/alarms; define custom rules thereby fine tuning of the LLMs used for this purpose to have accurate code generation, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automating cloud financial operations management optimizations by utilizing one or more processors along with allocated memory, the method comprising:
    implementing a cloud financial operations management module;
    establishing a communication link among the cloud financial operations management module, a plurality of infrastructure observability systems, and a plurality of Infrastructure as a Code (Iaac) systems of record via a communication interface;
    triggering the cloud financial operations management module through events from the infrastructure observability systems on cloud financial operations management based metrics and alerts data identifying environments to be corrected associated with a cloud;
    identifying, in response to triggering, IaaC code's originating code repository and related materials through corresponding systems of record;
    implementing an Artificial Intelligence (AI) Large Language Model (LLM) to automatically generate new code specific to the environments to be corrected associated with the cloud based on predefined rules received from a rule database and code received from the originating code repository;
    implementing a drift detection algorithm to detect changes between the new code and the code received from the originating code repository;
    automatically generating a report corresponding to the drift;
    determining whether an impact of implementing the detected changes based on the generated report in correcting the environments associated with the cloud on overall network environment is below, or equal to, or more than a preconfigured threshold value; and
    automatically correcting, in response to determining the impact, the environments associated with the cloud by implementing the new code.

2. The method according to claim 1, wherein in implementing the AI LLM, the method further comprising:
    implementing a Generative AI LLM by the cloud financial operations management module to write corresponding new code specific to network environments corresponding to each of said plurality of infrastructure observability systems.

3. The method according to claim 2, further comprising:
training the AI LLM based on the predefined rules thereby fine tuning the AI LLM implemented for generating the new code; and
automatically correcting, by implementing the trained AI LLM, the environments fully controlled by the new code in response to the cloud financial operations management based metrics and alerts data.

4. The method according to claim 1, further comprising:
determining that the impact of implementing the detected changes based on the generated report in correcting the environments associated with the cloud on overall network environment is below the preconfigured threshold value;
automatically merging the new code onto a continuous integration/continuous deployment (CI/CD) process; and
automatically triggering, in response to merging, the CI/CD process to automatically track additional code changes in the environments associated with the cloud.

5. The method according to claim 1, further comprising:
determining that the impact of implementing the detected changes based on the generated report in correcting the environments associated with the cloud on overall network environment is equal to or more than the preconfigured threshold value;
automatically generating an electronic notification and transmitting the electronic notification along with the generated report to a user;
receiving user input data indicating approval of the detected changes based on the generated report;
merging the new code onto a continuous integration/continuous deployment (CI/CD) process;
automatically triggering, in response to merging, the CI/CD process to automatically track additional code changes in the environments associated with the cloud; and
creating a feedback loop with said determining step, automatically generating an electronic notification step, receiving user input step indicating approval, merging the new code step, and automatically triggering the CI/CD process step for fine tuning and training the AI LLM for future implementation in automatically correcting future problems of the environments associated with the cloud.

6. The method according to claim 1, further comprising:
determining that the impact of implementing the detected changes based on the generated report in correcting the environments associated with the cloud on overall network environment is equal to or more than the preconfigured threshold value;
automatically generating an electronic notification and transmitting the electronic notification along with the generated report to a user;
receiving user input data indicating disapproval of the detected changes based on the generated report;
receiving user input data indicating modified new code;
merging the modified new code onto a continuous integration/continuous deployment (CI/CD) process;
automatically triggering, in response to merging, the CI/CD process to automatically track additional code changes in the environments associated with the cloud; and
creating a feedback loop with said determining step, automatically generating an electronic notification step, receiving user input step indicating disapproval, receiving user input data step indicating modified new code, merging the modified new code step, and automatically triggering the CI/CD process step for fine tuning and training the AI LLM for future implementation in automatically correcting future problems of the environments associated with the cloud.

7. A system for automating cloud financial operations management optimizations, the system comprising:
a processor; and
a memory operatively connected to the processor via a communication interface, the memory storing computer readable instructions, when executed, causes the processor to:
implement a cloud financial operations management module;
establish a communication link among the cloud financial operations management module, a plurality of infrastructure observability systems, and a plurality of Infrastructure as a Code (Iaac) systems of record via a communication interface;
trigger the cloud financial operations management module through events from the infrastructure observability systems on cloud financial operations management based metrics and alerts data identifying environments to be corrected associated with a cloud;
identify, in response to triggering, IaaC code's originating code repository and related materials through corresponding systems of record;
implement an Artificial Intelligence (AI) Large Language Model (LLM) to automatically generate new code specific to the environments to be corrected associated with the cloud based on predefined rules received from a rule database and code received from the originating code repository;
implement a drift detection algorithm to detect changes between the new code and the code received from the originating code repository;
automatically generate a report corresponding to the drift;
determine whether an impact of implementing the detected changes based on the generated report in correcting the environments associated with the cloud on overall network environment is below, or equal to, or more than a preconfigured threshold value; and
automatically correct, in response to determining the impact, the environments associated with the cloud by implementing the new code.

8. The system according to claim 7, in implementing the AI LLM, the processor is further configured to:
implement a Generative AI LLM by the cloud financial operations management module to write corresponding new code specific to network environments corresponding to each of said plurality of infrastructure observability systems.

9. The system according to claim 8, wherein the processor is further configured to:
train the AI LLM based on the predefined rules thereby fine tuning the AI LLM implemented for generating the new code; and
automatically correct, by implementing the trained AI LLM, the environments fully controlled by the new code in response to the cloud financial operations management based metrics and alerts data.

10. The system according to claim 7, wherein the processor is further configured to:
determine that the impact of implementing the detected changes based on the generated report in correcting the environments associated with the cloud on overall network environment is below the preconfigured threshold value;

automatically merge the new code onto a continuous integration/continuous deployment (CI/CD) process; and automatically trigger, in response to merging, the CI/CD process to automatically track additional code changes in the environments associated with the cloud.

11. The system according to claim 7, wherein the processor is further configured to:

determine that the impact of implementing the detected changes based on the generated report in correcting the environments associated with the cloud on overall network environment is equal to or more than the preconfigured threshold value;

automatically generate an electronic notification and transmit the electronic notification along with the generated report to a user;

receive user input data indicating approval of the detected changes based on the generated report;

merge the new code onto a continuous integration/continuous deployment (CI/CD) process;

automatically trigger, in response to merging, the CI/CD process to automatically track additional code changes in the environments associated with the cloud; and create a feedback loop with said determining step, automatically generate an electronic notification step, receive user input step indicating approval, merge the new code step, and automatically trigger the CI/CD process step for fine tuning and training the AI LLM for future implementation in automatically correcting future problems of the environments associated with the cloud.

12. The system according to claim 7, wherein the processor is further configured to:

determine that the impact of implementing the detected changes based on the generated report in correcting the environments associated with the cloud on overall network environment is equal to or more than the preconfigured threshold value;

automatically generate an electronic notification and transmit the electronic notification along with the generated report to a user;

receive user input data indicating disapproval of the detected changes based on the generated report;

receive user input data indicating modified new code;

merge the modified new code onto a continuous integration/continuous deployment (CI/CD) process;

automatically trigger, in response to merging, the CI/CD process to automatically track additional code changes in the environments associated with the cloud; and create a feedback loop with said determining step, automatically generate an electronic notification step, receive user input step indicating disapproval, receive user input data step indicating modified new code, merge the modified new code step, and automatically trigger the CI/CD process step for fine tuning and training the AI LLM for future implementation in automatically correcting future problems of the environments associated with the cloud.

13. A non-transitory computer readable medium configured to store instructions for automating cloud financial operations management optimizations, the instructions, when executed, cause a processor to perform the following:

implementing a cloud financial operations management module;

establishing a communication link among the cloud financial operations management module, a plurality of infrastructure observability systems, and a plurality of Infrastructure as a Code (Iaac) systems of record via a communication interface;

triggering the cloud financial operations management module through events from the infrastructure observability systems on cloud financial operations management based metrics and alerts data identifying environments to be corrected associated with a cloud;

identifying, in response to triggering, IaaC code's originating code repository and related materials through corresponding systems of record;

implementing an Artificial Intelligence (AI) Large Language Model (LLM) to automatically generate new code specific to the environments to be corrected associated with the cloud based on predefined rules received from a rule database and code received from the originating code repository;

implementing a drift detection algorithm to detect changes between the new code and the code received from the originating code repository;

automatically generating a report corresponding to the drift;

determining whether an impact of implementing the detected changes based on the generated report in correcting the environments associated with the cloud on overall network environment is below, or equal to, or more than a preconfigured threshold value; and automatically correcting, in response to determining the impact, the environments associated with the cloud by implementing the new code.

14. The non-transitory computer readable medium according to claim 13, in implementing the AI LLM, the instructions, when executed, cause the processor to further perform the following:

implementing a Generative AI LLM by the cloud financial operations management module to write corresponding new code specific to network environments corresponding to each of said plurality of infrastructure observability systems.

15. The non-transitory computer readable medium according to claim 14, wherein the instructions, when executed, cause the processor to further perform the following:

training the AI LLM based on the predefined rules thereby fine tuning the AI LLM implemented for generating the new code; and automatically correcting, by implementing the trained AI LLM, the environments fully controlled by the new code in response to the cloud financial operations management based metrics and alerts data.

16. The non-transitory computer readable medium according to claim 13, wherein the instructions, when executed, cause the processor to further perform the following:

determining that the impact of implementing the detected changes based on the generated report in correcting the environments associated with the cloud on overall network environment is below the preconfigured threshold value;

automatically merging the new code onto a continuous integration/continuous deployment (CI/CD) process; and automatically triggering, in response to merging, the CI/CD process to automatically track additional code changes in the environments associated with the cloud.

17. The non-transitory computer readable medium according to claim 13, wherein the instructions, when executed, cause the processor to further perform the following:
- determining that the impact of implementing the detected changes based on the generated report in correcting the environments associated with the cloud on overall network environment is equal to or more than the preconfigured threshold value;
- automatically generating an electronic notification and transmitting the electronic notification along with the generated report to a user;
- receiving user input data indicating approval of the detected changes based on the generated report;
- merging the new code onto a continuous integration/continuous deployment (CI/CD) process;
- automatically triggering, in response to merging, the CI/CD process to automatically track additional code changes in the environments associated with the cloud; and
- creating a feedback loop with said determining step, automatically generating an electronic notification step, receiving user input step indicating approval, merging the new code step, and automatically triggering the CI/CD process step for fine tuning and training the AI LLM for future implementation in automatically correcting future problems of the environments associated with the cloud.

18. The non-transitory computer readable medium according to claim 13, wherein the instructions, when executed, cause the processor to further perform the following:
- determining that the impact of implementing the detected changes based on the generated report in correcting the environments associated with the cloud on overall network environment is equal to or more than the preconfigured threshold value;
- automatically generating an electronic notification and transmitting the electronic notification along with the generated report to a user;
- receiving user input data indicating disapproval of the detected changes based on the generated report;
- receiving user input data indicating modified new code;
- merging the modified new code onto a continuous integration/continuous deployment (CI/CD) process;
- automatically triggering, in response to merging, the CI/CD process to automatically track additional code changes in the environments associated with the cloud; and
- creating a feedback loop with said determining step, automatically generating an electronic notification step, receiving user input step indicating disapproval, receiving user input data step indicating modified new code, merging the modified new code step, and automatically triggering the CI/CD process step for fine tuning and training the AI LLM for future implementation in automatically correcting future problems of the environments associated with the cloud.

* * * * *